Patented Jan. 30, 1951

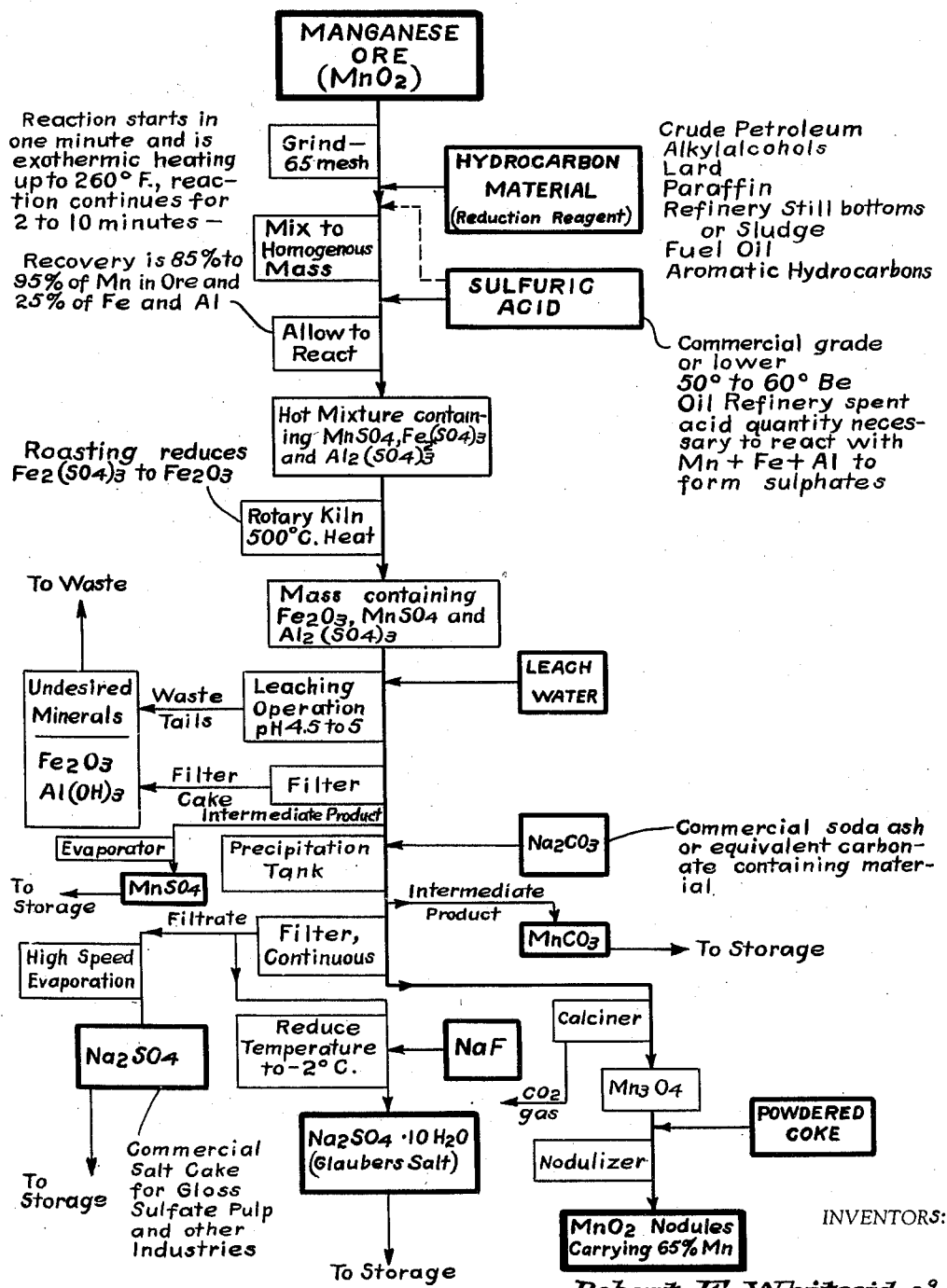

2,539,823

UNITED STATES PATENT OFFICE 2,539,823

MANGANESE ORE TREATMENT

William H. Furman and Robert F. Whitesides, Henderson, N. C., assignors of one-fourth to W. Lunsford Long, Warrenton, N. C., and one-fourth to Hewitt S. West, New York, N. Y.

Application November 22, 1949, Serial No. 128,874

5 Claims. (Cl. 23—117)

This invention relates to the treatment of manganese-containing ores and, more particularly, it is concerned with a method for recovering high quality manganese-containing products from manganese-bearing ores, including a special method for the reduction of manganese compounds in such ores, plus a combination of other steps for the production of compounds of high manganese content.

Manganese, because of its particular usefulness in connection with steel making and other alloy production, is a strategically important metal. Consequently, numerous methods have been devised for recovering manganese values as completely as possible from a large variety of manganese-bearing ores. Some of the proposed methods for such recoveries are in actual commercial use, whereas other such procedures have not been adapted to commercial production because of high cost of operation or other deficiencies.

Even with the recognized strategic importance of manganese, there are still a large amount of manganese-bearing ores which are not treated for the recovery of manganese values because of the small percentage of manganese which they contain or because contaminating materials present in these ores create supposedly unsurmountable difficulties. An example of one such type manganese-bearing materials, which are not now utilized for recovery of manganese values, are tailings derived from the flotation separation of manganese-bearing ores. However, with continued depletion of high manganese ores and increased demand for this material, it becomes necessary that some utilizable method be devised for the recovery of concentrated manganese values from the low-grade manganese ores.

A principal object of the present invention is the provision of a new method for recovering concentrated manganese values from low-grade manganese-bearing ores in a form which makes manganese available for various commercial uses. Still further objects include:

(1) The provision of a new method for the reduction of manganese from the tetravalent and trivalent state to the divalent state;

(2) The provision of a new method for transforming insoluble manganese compounds occurring in ores into a water-soluble form, namely, manganese sulfate;

(3) The provision of a new method for recovering manganese compounds, such as manganous sulfate, manganous carbonate and manganese dioxide in relatively high quality from low-grade ores in a commercially feasible manner;

(4) The provision of a manganese value recovery process in which contaminating materials, such as iron and aluminum, which occur in the ores along with manganese, are eliminated;

(5) The provision of a manganese ore treating procedure in which commercial salt cake or Glauber's salt in relatively pure form is obtained as a valuable by-product;

(6) The provision of such ore treatment procedures in which the extent and course of reaction at all stages is easily and accurately controlled, i. e., ore treating procedures in which extreme reaction conditions, unusual apparatus structure or limitations, or the like, are not required.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by a method which basically consists in taking manganese ore, ground, if necessary, to a fine powder, mixing the subdivided ore with a hydrocarbon material, such as crude petroleum, then mixing this mass with sulfuric acid. This mixture is allowed to react and rapidly comes to completion as the mass heats up, due to exothermically developed heat. The reacted mixture is then roasted at a temperature about red heat, which reduces the iron sulfate to insoluble iron oxide. Thereafter, the roasted product is dumped into water forming a suspension having a pH of 4.5 to 5.5, neutralizing agents, such as manganous carbonate, being added to the first quantity of leach water, if necessary, to adjust the pH. Leaching should be carried out at a temperature above 80° C. in order to aid in the flocculation of the Al and Fe precipitates, sensible heat in the roasted product being made use of to bring about the heating The filtered cake and tailings from the leaching contain undesirable iron and aluminum values and are discarded to waste, while the manganese-containing filtrate is further treated for recovery of desirable manganese compounds.

Manganous sulfate of relatively high purity can be obtained by evaporating the filtrate. Manganous carbonate is obtained by reaction of the filtrate with a carbonate-containing material, such as sodium carbonate, which results in the precipitation of manganous carbonate, leaving sodium sulfate in solution. The manganous carbonate, after drying, can be used as such or may be employed to obtain high quality manganese-containing materials by roasting, which transforms the carbonate to $Mn_3O_4$ and carbon dioxide. This is mixed with a small quantity of powdered carbon and then treated in a nodulizer to form $MnO_2$ nodules, carrying about 65% Mn. This final, high quality Mn product can then be used for metallurgical purposes or related uses demanding manganese products of high Mn concentrates.

The sodium sulfate containing filtrate may either be treated for recovery for commercial salt cake or Glauber's salt. For salt cake, the filtrate is evaporated in a high-speed evaporator. If the Glauber's salt is desired, a small quantity of sodium fluoride is added to the filtrate, and the solution is then cooled to minus 2° C. and hydrated sodium sulfate precipitates.

A more complete understanding of the process of this invention, as generally described above, may be had by reference to the accompanying drawing which is a flow diagram of the entire process as comprehended by this invention. In the flow diagram, preferred reaction materials and reaction conditions have been indicated along with the actual procedural steps, starting materials and the resulting products involved.

The success of the present invention is due, to a large extent, to the discovery that certain organic compounds can be used in conjunction with the sulfuric acid to reduce the tetra and trivalent insoluble forms of manganese compounds contained in treated ores into water-soluble manganous sulfate. It has been found that this reduction proceeds smoothly with the formation of considerable exothermic heat which can be successfully utilized to hasten the completion of the reduction operation. At the same time, it has been found unnecessary to subject the mixture to any unusual reaction conditions in order to bring about the reduction, as has been necessary in most related operations employed heretofore. The smoothness and ease of reaction in this reduction is apparently due to the fact that the organic compounds, i. e., hydrocarbon materials, in the presence of the manganese-containing ore and sulfuric acid releases nascent carbon which starts the exothermic reaction. This, in turn, furnishes sufficient localized heat, causing further release of nascent carbon and the reaction continues until completed.

The procedure generally outlined above is applicable to all manganese-bearing ores and will, of course, operate very successfully with high grade manganese ores. However, it will also operate with equal success on low grade ores and, it is because of this fact that the new procedure is most noteworthy.

If the manganese ore to be treated is not in finely divided form, it should be ground prior to use, preferably to a size about 55–65 mesh. Ore-containing silica and varying amounts of iron and aluminum can be used, although low iron and aluminum containing ores are preferred.

As indicated, the first major step of the process is the formation of a mixture of the ore and certain organic compounds, particularly hydrocarbon materials. Organic compounds which may be used include fats, waxes, alcohols, aromatic hydrocarbons, terpenes, resins, coal tar products and similar materials, but cheap hydrocarbon materials are preferred, including paraffin, refinery still bottoms, refinery sludge, and petroleum oils, such as crude petroleum, fuel oil, waste oil, or the like.

The concentration of hydrocarbon material used in the ore reduction step is not critical and may be varied in order to compensate for oxide and other content of the ore being treated. Furthermore, the concentration of this material will vary, to some extent, depending upon the particular substances employed in the reaction. A quantity of hydrocarbon material between one and 30 parts per 100 parts of ore is representative of preferred quantities to be used, but amounts outside this range can be employed under some circumstances.

The ore/hydrocarbon mixture is reacted with sulfuric acid. Commercial grade or lower quality sulfuric acid may be employed, preferably acid of strength corresponding to 50° to 66° Bé. Any commercial source of sulfuric acid is suitable however, and low grade spent acid from oil refineries and similar materials are particularly acceptable. The quantity of acid and hydrocarbon material employed in the reaction is the theoretical amount necessary to react with the manganese iron and aluminum values of the ore to form sulfates, although slight excesses of this amount can be employed.

Subsequent to the addition of the sulfuric acid to the pulp mass, the reaction starts in approximately one minute and is quite strongly exothermic, developing temperatures up to 260° F. Without the addition of any outside heat, the reaction continues for from 2 to 20 minutes, with the $MnO_2$ being reduced to MnO, which further reacts with the sulfuric acid to form water-soluble sulfate. Recovery is approximately 85–95% of the Mn contained in the ore, while about 25% of the iron and aluminum content of the ore is recovered in the form of sulfates.

The speed of reaction in the step of reduction of the manganese ore with hydrocarbon and acid can be controlled by various methods, such as the use of external cooling or the like, but it has been found that unusually good control may be obtained by regulating the strength of the sulfuric acid used. Thus, while substantially any concentration of acid from 30 to 100% can be employed, we have found that acid of 75 to 95% is most useful in the process and gives the most desirable speed of reaction with the majority of ores to be encountered.

Varying amounts of acid can be employed in the reaction and the exact quantity will depend upon the actual concentration of the acid and also the composition of the ore under treatment. A large excess of acid can be tolerated, but is undesirable because it is best to obtain a final reaction mixture which is substantially neutral and low qualities of acid are to be avoided because the desirable values of the ore will not be fully extracted. It is preferable that just sufficient acid be used as is necessary to combine with all of the manganese, iron and aluminum content of the ore to form the corresponding sulfates. Representative quantities of acid useful in the process are, in terms of 95% sulfuric acid, 20–80 parts of acid for each 100 parts of ore of average composition.

The roasting operation applied to the reacted ore pulp can be carried out under a variety of conditions, but is preferably conducted at low red heat, i. e., about 500° C. This roasting reduces the iron sulfate to insoluble iron oxide.

The iron oxide and aluminum in the roasted product are eliminated as insoluble gangue, removed by leaching the roasted material with water at a pH 4.5 to 5.5. Neutralization to this pH, if necessary, may be accomplished by use of $MnCO_3$, although other neutralizing reagents, such as calcium carbonate, may be utilized. This leaching transforms the aluminum sulfate into aluminum hydroxide which is removed by filtration along with the iron and discarded with the gangue.

The manganese is contained in the resulting filtrate in such high quality that the manganese can be utilized without further treatment, except evaporation of water from the filtrate. This results in the production of solid manganese sulfate. On the other hand, the manganous sulfate present in this solution can be separated, if desired, by any other suitable method.

In the event that a less acidic manganese product or one of higher manganese content than $MnSO_4$ is desired, the additional treatment of the filtrate as discussed above can be carried out. In these operations, a carbonate-containing material is used for transforming the sulfate into $MnCO_3$. Any suitable carbonate-containing material, such as calcium carbonate, can be used for this purpose, but sodium carbonate in the form of commercial soda ash has been found most desirable, because with the use of this material, sodium sulfate is obtained as a valuable by-product.

Reaction of the filtrate with a carbonate produces $MnCO_3$ which can be recovered and used as such or be further transformed into a product of higher Mn content. This is most readily accomplished by roasting or calcining the $MnCO_3$ which forms $CO_2$ gas, that can be used to produce dry ice or for other industrial operations, and $Mn_3O_4$ containing about 62% Mn. This is formed into nodules by admixture with a small amount of powdered coke or other carbon material to change the oxide to $MnO_2$.

This mixture is charged into a nodulizer and formed into $MnO_2$ nodules carrying 65% Mn which can be used for the production of steel alloys or other metallurgical purposes.

With a general description of the process, as given above, and various modifications which can be employed in the process in mind, a detailed understanding of the procedures of this invention can be had by reference to the following illustrative examples of actual operation of the process in which all parts are by weight.

Example I

This example illustrates the production of manganous sulfate and some major steps in the process of this invention.

50 parts of ground ore assaying 21.24% manganese is mixed with 4 parts of crude oil and 35 parts of 60° Baumé sulfuric acid. The exothermic reaction begins slowly and gradually increases until the reaction has completed. After the reaction subsides, the mass is roasted at 500° C. in order to decompose the impurity ferric sulfate to ferric oxide and also to drive off the slight excess of sulfuric acid.

The residue is dumped in sufficient water to dissolve the manganous sulfate giving a pulp having a pH of 4.5 to 5.5 containing, as precipitates, aluminum hydroxide along with any remaining iron oxide.

This pulp is then filtered and washed with water which gives a solution of manganous sulfate free of sulfuric acid and impurities found in the ore.

The solution contains 86.78% of the manganese contained in the original ore. It may be evaporated in order to obtain pure manganous sulfate.

Example II

This example is similar in illustration to Example I.

50 parts of ore assaying 21.24% manganese and ground to 60 mesh is added to a mixture of 4 parts of fuel oil and 34 parts of 60° Baumé sulfuric acid. The procedure followed was the same as Example I with a subsequent recovery of 88.33% of the manganese in the original ore as manganous sulfate, which is recovered by evaporation.

Example III

This example illustrates the production of manganese dioxide nodules of high manganese content.

100 parts of low-grade manganese-bearing ore are ground to 65 mesh size and then mixed with 10 parts of crude oil in a tumbler mixer for sufficient length of time to give a homogenous mass. This mixture is charged into an acid-resistant reaction kettle provided with stirring equipment for agitating a heavy mass and 65 parts of 60° Bé. commercial grade sulfuric acid is added. Within a minute, with the mixture agitated, reaction between the ingredients takes place with evolution of heat. Reaction continues for about 10 minutes longer, during which time the temperature gradually rises to a high of about 250° F. Reaction then comes to completion, as can be detected by discontinuance of reaction heat evolution.

The mass is now charged into an acid-resistant rotary kiln where it is roasted at a temperature of about 500° C. This results in the transformation of ferric sulfate content into ferric oxide and also drives off slight excess of sulfuric acid.

The mass from the roasting operation is then passed into 200 parts of water in which it is agitated. The pulp is filtered and the residue washed with 100 parts of water, the wash water and filtrate being combined and the insoluble residue being discarded.

25 parts of soda ash are added to the combined wash and filtrate and the mixture stirred to cause reaction between the $Na_2CO_3$ and $MnSO_4$. The resulting slurry is led to a continuous filter where the $MnCO_3$ is removed from the solution. The resulting filtrate is passed to a high speed evaporator where water is evaporated and commercial salt cake collected as a by-product of the process.

The settled and filtered $MnCO_3$ is passed to a rotary calciner where $CO_2$ gas is displaced from the carbonate and collected, while an $Mn_3O_4$ containing product is obtained as a solid residue. This residue is mixed with 10 parts of powdered coke, or other carbon products, such as charcoal or coal, and the mixture then charged into a nodulizing kiln, where it is fused into nodules. The product collected from the nodulizer comprises $MnO_2$ nodules carrying 65% Mn and the product is conveyed to storage bins for subsequent use in metallurgical operations, such as production of alloy steels, deoxidizing purposes in steel making and the like.

The treatment process as described above is generally applicable to all types of manganese-bearing ores, including psilomane, manganite and pyrolusite. As indicated, the process is of particular interest in connection with the treatment of low-grade manganese ores, where a high recovery must be obtained with a minimum amount of materials, operational steps and energy expenditures. Actually, the process is so relatively simple and economically attractive that it makes possible the recovery of manganese from such low-grade materials as the tailings from ore flotation operations.

We claim:

1. In the method of recovering concentrated manganese values from ores-bearing manganese in an insoluble form with a valency greater than two, the steps which comprise mixing said ore with a petroleum oil from the group consisting of crude oil, fuel oil and lubricating oil, adding concentrated sulfuric acid to the mixture, allowing the ingredients to react, whereby the manganese content of the ore is transformed into manganous sulfate, and recovering manganous sulfate from the reaction mixture.

2. In the method of extracting manganese in the form of manganous sulfate from manganese-bearing ores containing the manganese as insoluble compounds with a valency greater than two, the steps which comprise forming a mixture of said ore with a petroleum oil, adding sulfuric acid to said mixture in a quantity sufficient to react with the manganese, iron, and aluminum content of the ore to form the sulfates thereof, allowing the ingredients to react to form a pulp containing manganese sulfate, ferric sulfate, and aluminum sulfate, separating the iron and aluminum from the reaction mixture as insoluble residue and recovering manganous sulfate from the reaction mixture.

3. The method of recovering a high Mn content $MnO_2$ product from manganese-bearing ores containing iron and aluminum which comprises forming an ore mass by admixture of ground manganese-bearing ore with sulfuric acid and a liquid hydrocarbon, allowing the admixed materials to react, whereby the manganese values in the ore are transformed to manganous sulfate, roasting the resulting pulp at red heat, leaching the roasted material with water at a pH between 4.5 and 5.5, recovering $MnSO_4$ as filtrate from said leaching step, reacting the filtrate with a carbonate ion providing material, whereby $MnCO_3$ is precipitated from the solution, roasting the resulting $MnCO_3$, adding carbon to the roasted product, heating the carbon and roasted product together and recovering $MnO_2$ containing nodules comprising about 65% Mn by weight.

4. A method as claimed in claim 3, wherein the recovered $MnCO_3$ is roasted to evolve $CO_2$, the resulting manganese oxide product is mixed with powdered carbon, the resulting mass is heated and an $MnO_2$ product comprising about 65% Mn by weight is obtained.

5. The method of recovering a high Mn content $MnO_2$ product from manganese-bearing ores containing manganese in an insoluble form with a valency greater than two, along with iron and aluminum compounds which comprises forming a mixture of a major portion of said ore and a minor portion of a petroleum oil, adding sulfuric acid to the mixture in a quantity sufficient to react with all of the manganese, iron and aluminum content of the ore to form the corresponding sulfates, allowing the ingredients of the mixtures to react, whereby a pulp is obtained containing the manganese values of the ore in the form of $MnSO_4$, roasting the resulting pulp at red heat, leaching the roasted material with water at a pH between 4.5 and 5.5, filtering the aqueous mixture to obtain an insoluble residue comprising iron oxide and aluminum hydroxide and a filtrate comprising a solution of $MnSO_4$, reacting the filtrate with sodium carbonate, whereby $MnCO_3$ is precipitated therefrom, calcining the resulting $MnCO_3$, mixing the calcined product with powdered carbon, heating the resulting coke mixture and recovering an $MnO_2$ product having about 65% Mn content by weight.

WILLIAM H. FURMAN.
ROBERT F. WHITESIDES.

REFERENCES CITED

The following references are of record in the file of this patent:

UNITED STATES PATENTS

| Number | Name | Date |
|---|---|---|
| 2,343,293 | Hannay et al. | Mar. 7, 1944 |
| 2,450,870 | Daugherty | Oct. 12, 1948 |
| 2,451,647 | Allen | Oct. 19, 1948 |

OTHER REFERENCES

Degering's "Outline of Organic Chemistry," 1937 ed., p. 25, Barnes & Noble, Inc., N. Y.